(12) United States Patent
Granberry

(10) Patent No.: US 9,936,837 B1
(45) Date of Patent: Apr. 10, 2018

(54) COMBINED ROTISSERIE OVEN, RANGE AND FRYER

(71) Applicant: Byron L. Granberry, Union City, CA (US)

(72) Inventor: Byron L. Granberry, Union City, CA (US)

( * ) Notice: Subject to any disclaimer, the term of this patent is extended or adjusted under 35 U.S.C. 154(b) by 469 days.

(21) Appl. No.: 14/508,590

(22) Filed: Oct. 7, 2014

(51) Int. Cl.
*A47J 37/07* (2006.01)
*A47J 44/00* (2006.01)

(52) U.S. Cl.
CPC ................................. *A47J 44/00* (2013.01)

(58) Field of Classification Search
CPC A47J 44/00; A47J 27/004; A47J 27/62; A47J 37/06; A47J 36/00; A47J 36/20; A47J 37/041; A47J 37/04; A47J 37/0676; A47J 37/0688; A47J 37/07; A47J 37/1204; A47J 37/1266; A47J 43/0716; A47J 43/0761; A47J 43/18; A23L 5/10; F24C 7/085
USPC .................................... 99/324–450
See application file for complete search history.

(56) References Cited

U.S. PATENT DOCUMENTS

| | | | |
|---|---|---|---|
| 2,330,132 A | 9/1943 | Martin et al. | |
| 2,821,903 A | 2/1958 | Allen, Jr. et al. | |
| 3,797,375 A * | 3/1974 | Cerola | F24C 15/2042 219/449.1 |
| 3,845,702 A * | 11/1974 | Mies | A47J 27/0817 210/162 |
| 3,941,043 A * | 3/1976 | Cerola | A47J 37/1276 99/339 |
| 6,382,086 B1 | 5/2002 | Roberts | |
| 8,272,321 B1 | 9/2012 | Kalsi et al. | |
| 2003/0127451 A1* | 7/2003 | Lile | A47J 27/62 219/497 |
| 2008/0098902 A1* | 5/2008 | Mansfield | A47J 37/0786 99/339 |
| 2008/0245357 A1* | 10/2008 | Meether | A47J 37/0704 126/25 R |
| 2009/0183729 A1* | 7/2009 | Barkhouse | A47J 27/62 126/39 BA |
| 2012/0204733 A1* | 8/2012 | Dennis | A47J 37/045 99/443 C |
| 2012/0247448 A1* | 10/2012 | Thibodeaux | A47J 37/07 126/25 R |
| 2014/0261009 A1* | 9/2014 | Bringe | A47J 37/067 99/340 |

* cited by examiner

*Primary Examiner* — Arthur O Hall
*Assistant Examiner* — Adam J Rogers
(74) *Attorney, Agent, or Firm* — Stevenson IP, LLC

(57) ABSTRACT

A combined rotisserie oven, range and fryer included in a single device having an oven housing with an oven compartment, a plurality of oven, range and fryer heating elements. A removable rotisserie spit is reversibly engaged with and driven by a rotisserie spit gear disposed within the oven compartment. A range top with a plurality of range burners is disposed on the oven compartment. A grill is also disposed upon the range top. A deep fryer pan is disposed within a fryer pan chamber of the oven housing. A mesh wired deep fryer basket having a handle fits within the deep fryer pan, while a lid fits over each of the deep fryer pan and the deep fryer basket. A removable deep fryer control panel is removably engaged with a master control panel. The removable deep fryer control panel includes a deep fryer heating element and a thermostat.

10 Claims, 5 Drawing Sheets

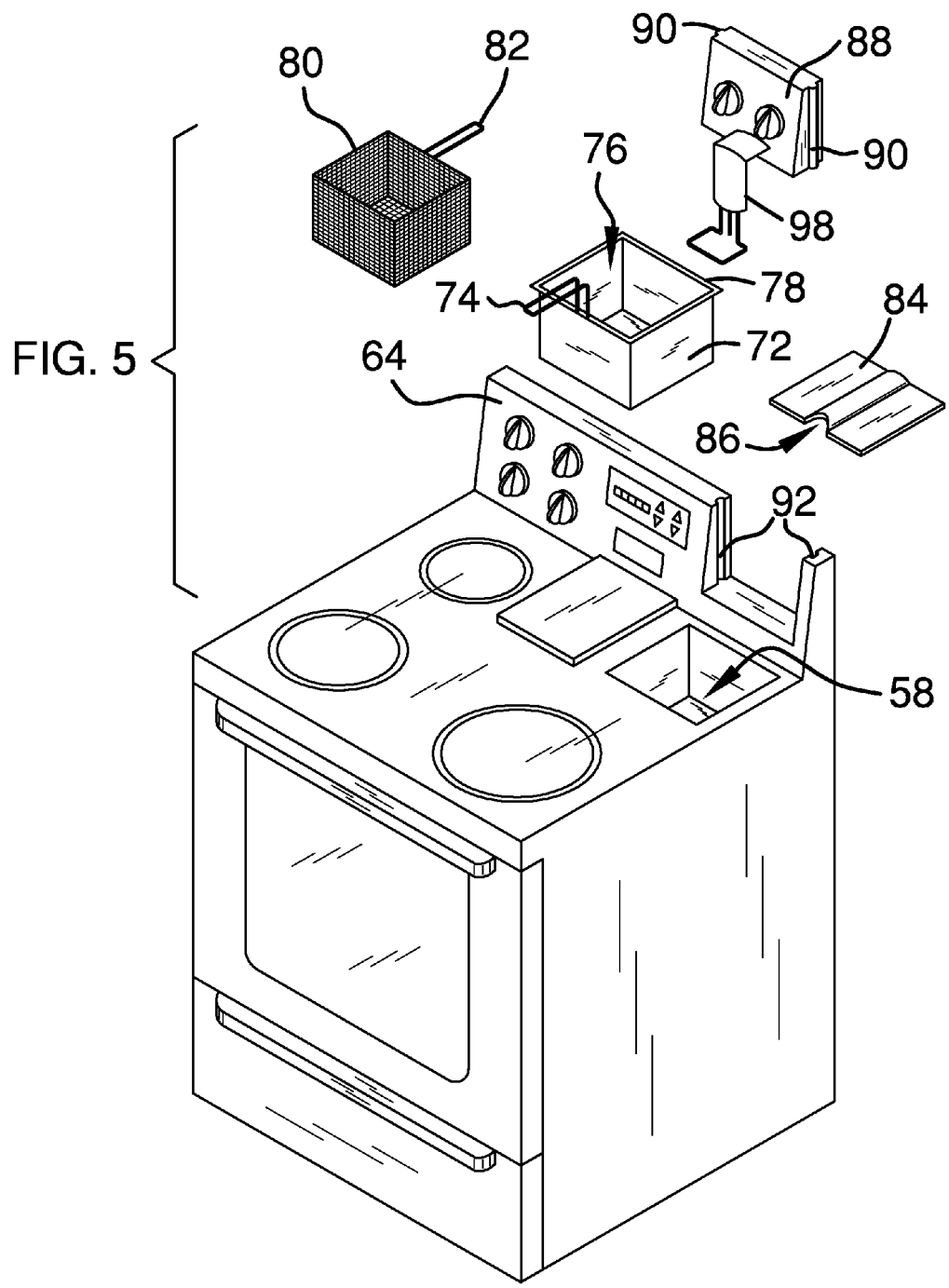

COMBINED ROTISSERIE OVEN, RANGE AND FRYER

BACKGROUND OF THE INVENTION

Various types of ovens, ranges, and fryers are known in the prior art. Rotisserie ovens are great at providing indirect cooking, slow roasting, providing surface finishing, and browning, however these devices are generally incapable of grilling, frying, or cooking foods through direct cooking. While, ranges can provide a uniform heating surface providing direct cooking means for searing meats and vegetables, a range is incapable of slow roasting a dish or serving as a deep fryer. Additionally, a fryer has certain safety conditions that must be met in order to safely fry food, and is incapable of slow roasting a dish, or providing indirect heating. These safety requirements include having a stable, relatively immovable deep fryer pan, that prevents oil from sloshing around. An added problem of each of these devices is that they exist only in single units, thus, each device requires its own real-estate in the kitchen. The more devices that are required to cook a meal, the less room there is in the kitchen.

Thus, what is needed is a combination rotisserie oven, grill and fryer, included in a single device that drastically reduces the counter top space and provides the various cooking methods available through the different oven, grill and fryer devices.

FIELD OF THE INVENTION

The present invention relates to an oven, a range and a fryer, and more particularly, to a combined rotisserie oven, range and fryer included in a single device, which requires no additional components to bake, grill, or fry foods.

SUMMARY OF THE INVENTION

The general purpose of the present combined rotisserie oven, range and fryer, described subsequently in greater detail, is to provide a combined rotisserie oven, range and fryer which has many novel features that result in a combined rotisserie oven, range and fryer which is not anticipated, rendered obvious, suggested, or even implied by prior art, either alone or in combination thereof.

The combined rotisserie oven, range and fryer includes an oven housing having a plurality of walls forming an oven compartment. An access door is disposed in one of the plurality of walls enclosing the oven compartment. The access door has both a handle and a window. A drawer having a handle is disposed in the oven housing. The drawer is larger enough to accommodate storage of large pots and pans.

A plurality of oven heating elements is disposed within the oven compartment. A rotisserie spit gear is also disposed within the oven compartment. A removable rotisserie spit is removably disposed within the oven compartment and is reversibly engaged with the rotisserie spit gear. The rotisserie spit includes at least one spear.

The device also includes a rotisserie motor having a rotisserie motor gear. The rotisserie motor gear is in operational communication with the rotisserie spit gear via a chain. A removable drip pan is disposed within the oven compartment proximal a bottom of the oven compartment.

A range top is disposed upon a top of the oven housing. The range top has a plurality of range burners, each range burner of the plurality of range burners having a range heating element. The range top also has a fryer pan chamber. A grill is also disposed upon the range top. The grill having a plurality of grill heating elements. It is envisioned that the grill could be selected from the group consisting of electric grills, charcoal briquette grills, and gas burning grills. It is also envisioned that the grill has a grill grate that may be either a continuous non-stick angular grooved grill grate or a cross wired grill grate.

A master control panel is disposed upon the top of the oven housing. The master control panel includes a plurality of buttons, a plurality of knobs, and a display panel. The master control panel is in operational communication with each of the plurality of oven heating elements, the rotisserie motor, the plurality of range heating elements, and the plurality of grill heating elements. The knobs to activate each of the respective range burners, while buttons activate each of the oven heating elements. The display panel is configured to display temperature and time measurements.

The device includes a deep fryer pan having a handle, a basin, and a rim. The deep fryer pan is removably disposed upon the range top within the fryer pan chamber, the rim configured to overlay and be retained by the range top. A mesh wired deep fryer basket having a basket handle is included. The deep fryer basket is configured to fit within the basin of the deep fryer pan. A deep fryer pan lid having a recess is configured to rest flushly upon the rim of the deep fryer pan and enclose the basin. The recess being large enough to fit each of the handle of the deep fryer pan and the basket handle between the recess and the rim of the deep fryer pan.

A removable deep fryer control panel is removably disposed upon the master control panel via a plurality of rails and a plurality of slots. The rails are disposed upon the deep fryer control panel, while the slots are disposed upon the master control panel. The rails are configured to reversibly engage the slots securing the deep fryer control panel upon the master control panel and offering a point of contact to provide operational communication. The deep fryer control panel includes at least one of the knobs.

A deep fryer heating element is disposed upon and in operational communication with the deep fryer control panel. The deep fryer control panel is configured to activate the deep fryer heating element bringing the deep fryer heating element to a user controlled temperature. The deep fryer heating element is extended away from the deep fryer control panel into the basin of the deep fryer pan and is configured to heat the deep fryer pan. A thermostat is also disposed upon and in operational communication with the deep fryer control panel. The thermostat is configured to take a temperature measurement of an oil disposed within the basin, sending the temperature measurement to the deep fryer control panel. The deep fryer control panel is configured to send the temperature reading to the master control panel. An insulation partially encompasses a portion of the deep fryer heating element proximal the deep fryer control panel. This insulation insulates what would otherwise be an exposed portion of the deep fryer heating element and protects a user from inadvertently burning themselves upon the heated deep fryer heating element.

It is envisioned that each of the master control panel, the rotisserie motor, the plurality of range burners, the plurality of oven heating elements, and the plurality of grill heating elements may be powered by electrical power means by placing said items in circuit, connecting the circuit with an AC or DC power chord and coupling this with an electrical wall outlet. The deep fryer control panel and the deep fryer heating element can also be powered by electrical power means, as described above, by removably placing the deep fryer control panel in circuit with the master control panel and the other aforementioned electrically powered components. Additionally, it is envisioned that each of the plurality of oven heating elements, the plurality of range burners, and the plurality of grill heating elements can be powered by gas power means. Any heating elements being powered by gas power means would also include electric spark igniters in circuit with the electrical power means to create an ignition of a flammable gas. Finally, it is envisioned that the range burners can be induction heating elements and can heat through the principles of induction heating.

Thus has been broadly outlined the more important features of the present combined rotisserie oven, range and fryer so that the detailed description thereof that follows may be better understood and in order that the present contribution to the art may be better appreciated.

Numerous objects, features and advantages of the present combined-rotisserie oven, range and fryer will be readily apparent to those of ordinary skill in the art upon reading the following detailed description of presently preferred, but nonetheless illustrative, examples of the present combined rotisserie oven, range and fryer when taken in conjunction with the accompanying drawings.

BRIEF DESCRIPTION OF THE DRAWINGS

Figures

FIG. 5 is an exploded view.

DETAILED DESCRIPTION OF THE DRAWINGS

Figure 1:
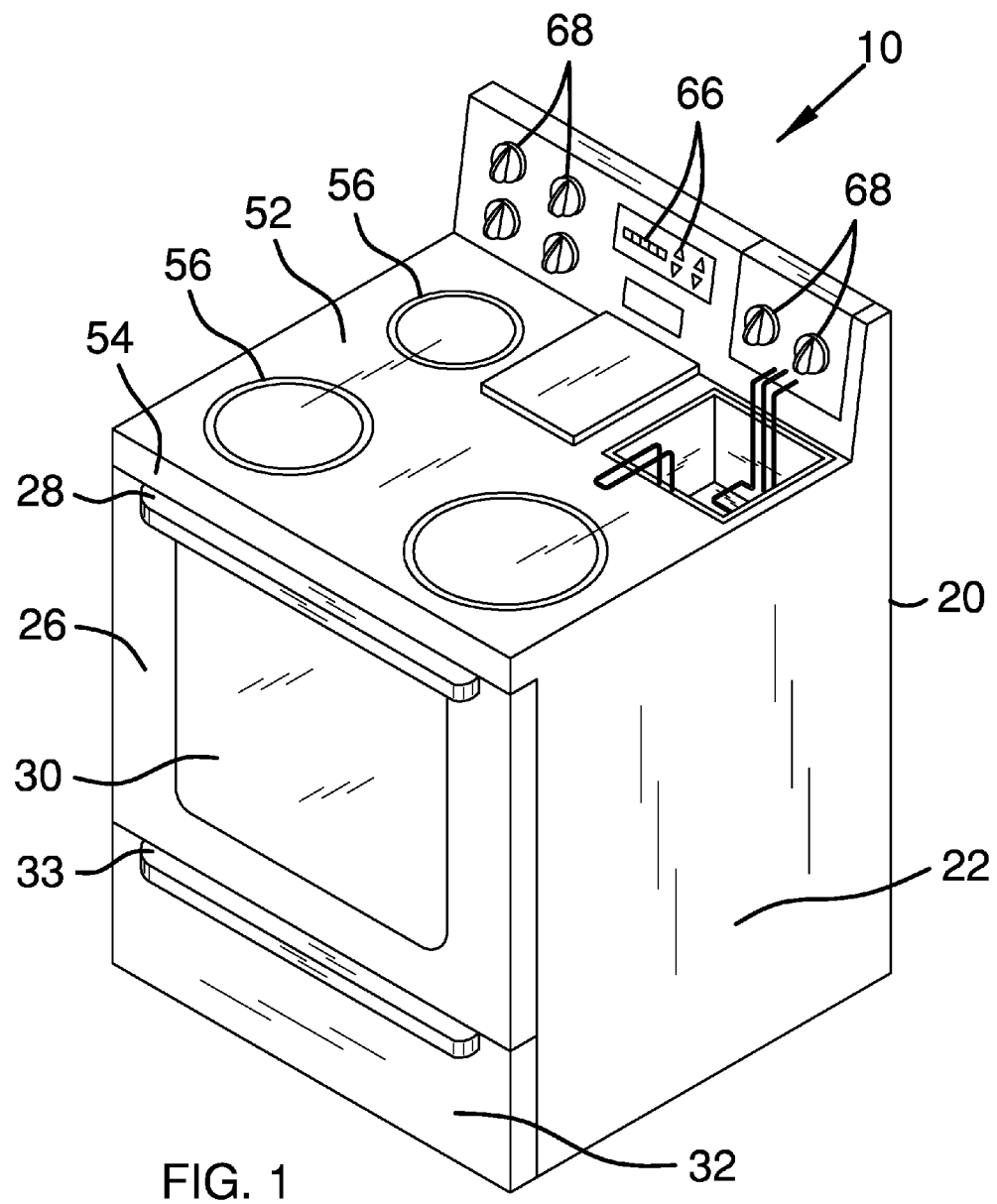
FIG. 1 is an isometric view.
Figure 2:
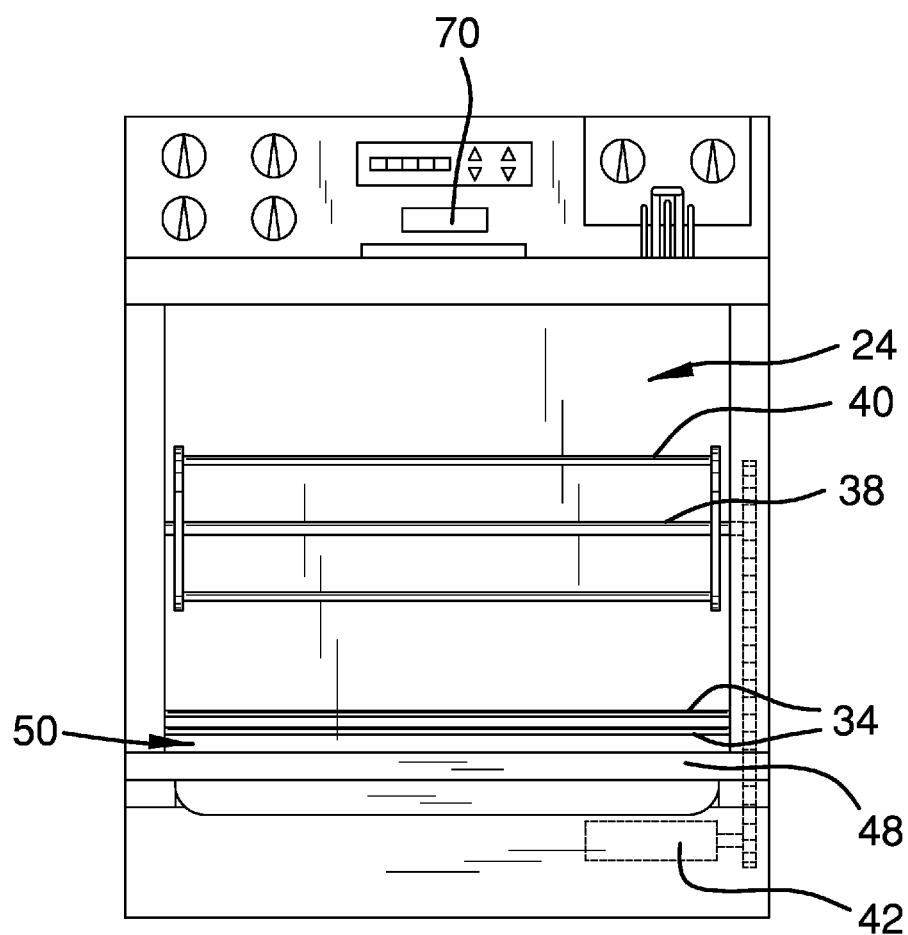
FIG. 2 is a front view showing the oven compartment.
Figure 3:
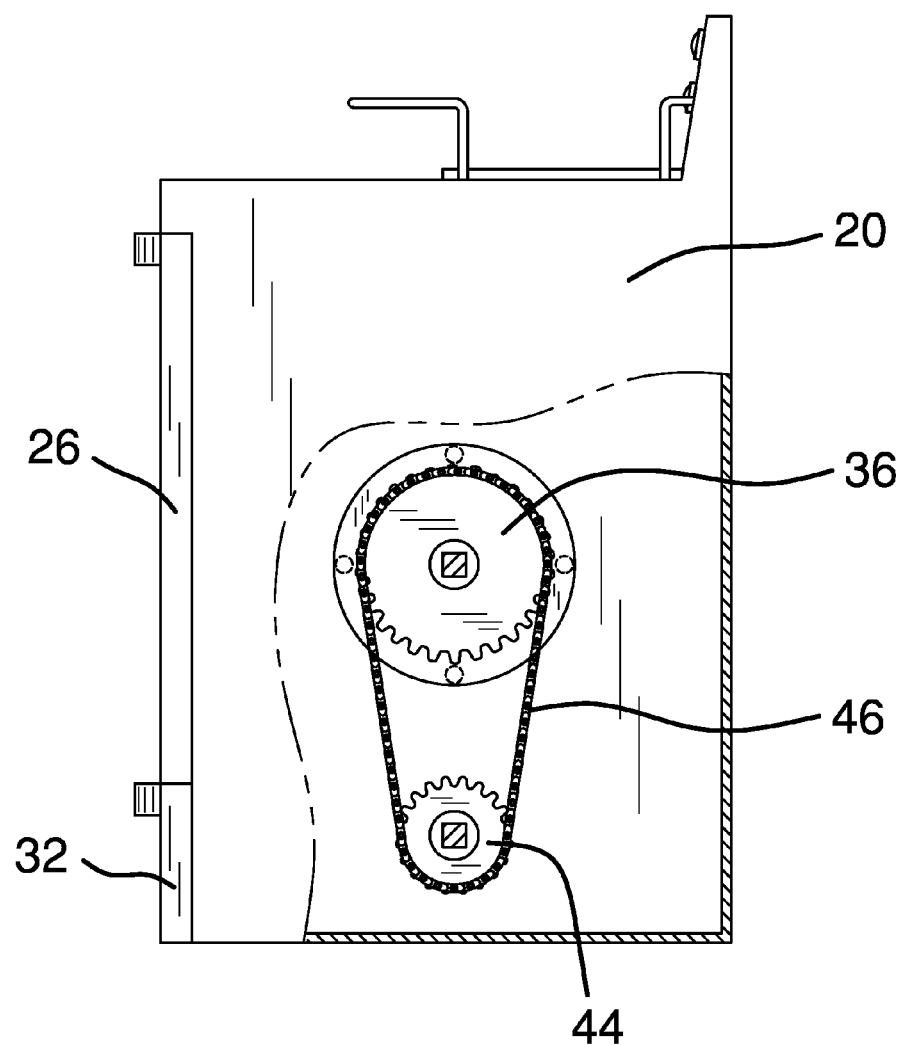
FIG. 3 is a side view showing the rotisserie motor gear and the rotisserie spit gear.
Figure 4:
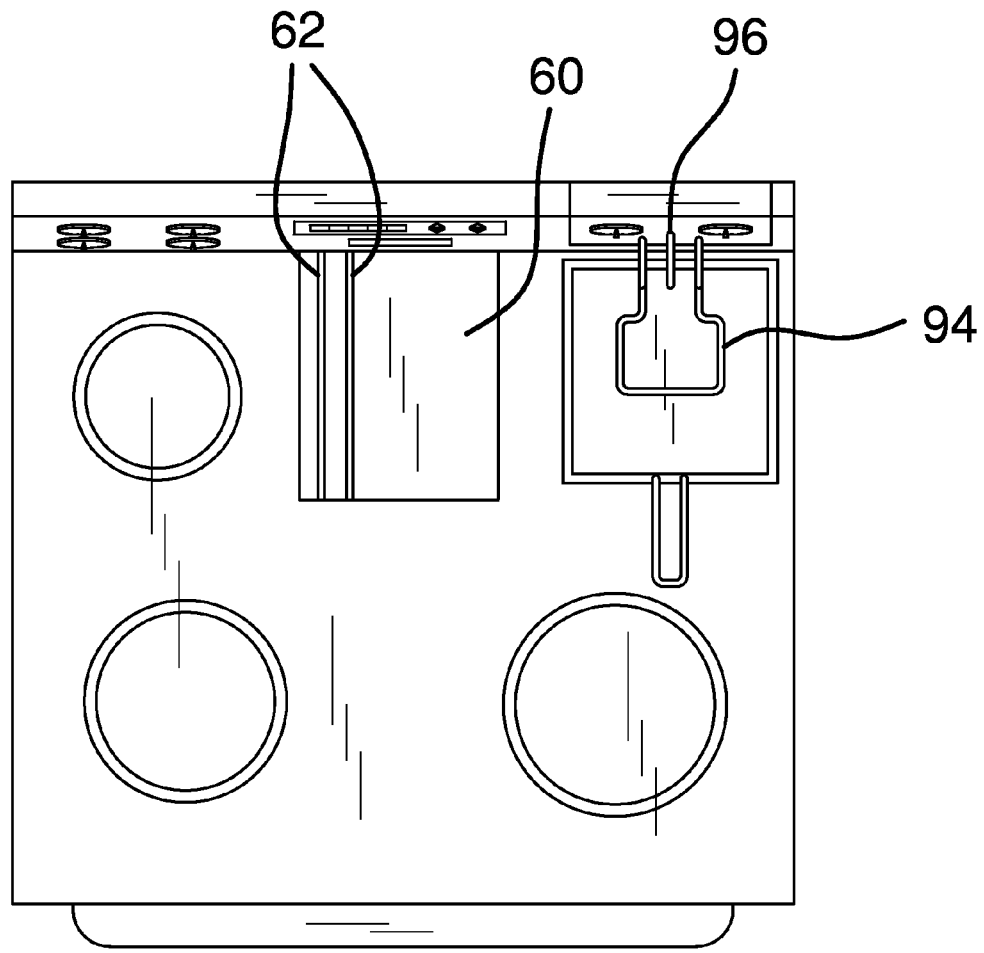
FIG. 4 is an above view.

With reference now to the drawings, and in particular FIGS. 1 through 5 thereof, the instant combined rotisserie oven, range and fryer employing the principles and concepts of the present combined rotisserie oven, range and fryer and generally designated by the reference number 10 will be described.

Referring to FIGS. 1 through 5 a preferred embodiment of the present combined rotisserie oven, range and fryer 10, is illustrated. The combined rotisserie oven, range and fryer 10 includes an oven housing 20 having a plurality of walls 22 forming an oven compartment 24. An access door 26 is disposed in one of the plurality of walls 22 enclosing the oven compartment 24. The access door 26 has both a door handle 28 and a window 30. A drawer 32 having a drawer handle 33 is disposed in the oven housing 20. The drawer 32 is large enough to accommodate storage of large pots and pans.

A plurality of oven heating elements 34 is disposed within the oven compartment 24. A rotisserie spit gear 36 is also disposed within the oven compartment 24. A removable rotisserie spit 38 is removably disposed within the oven compartment 24 and is reversibly engaged with the rotisserie spit gear 36. The rotisserie spit 38 includes at least one spear 40.

The device 10 also includes a rotisserie motor 42 having a rotisserie motor gear 44. The rotisserie motor gear 44 is in operational communication with the rotisserie spit gear 36 via a chain 46. The rotisserie motor 42 is configured to drive rotation of the rotisserie motor gear 44, which in turn drives rotation of the rotisserie spit gear 36 via the chain 46. A removable drip pan 48 is disposed within the oven compartment 24 proximal a bottom 50 of the oven compartment 24.

A range top 52 is disposed upon a top 54 of the oven housing 20. The range top 52 has a plurality of range burners, each range burner of the plurality of range burners having a range heating element 56. The range top also has a fryer pan chamber 58. A grill 60 is also disposed upon the range top 52. The grill 60 has a plurality of grill heating elements 62.

A master control panel 64 is disposed upon the top 54 of the oven housing 20. The master control panel 64 includes a plurality of buttons 66, a plurality of knobs 68, and a display panel 70. The master control panel 72 is in operational communication with each of the plurality of oven heating elements 34, the rotisserie motor 42, the plurality of range heating elements 56, and the plurality of grill heating elements 62 and is and configured to activate each of these elements. The knobs 68 are configured to activate each of the respective range heating elements 56, while buttons 66 are configured to activate each of the oven heating elements 34. The display panel 70 is configured to display temperature and time measurements.

The device 10 includes a deep fryer pan 72 having a retractable handle 74, a basin 76, and a rim 78. The deep fryer pan 72 is removably disposed upon the range top 52 within the fryer pan chamber 58, the rim 78 configured to overlay and be retained by the range top 52. A mesh wired deep fryer basket 80 having a basket handle 82 is included. The deep fryer basket 80 is configured to fit within the basin 76 of the deep fryer pan 72. A deep fryer pan lid 84 having a recess 86 is configured to rest flushly upon the rim 78 of the deep fryer pan 72 and enclose the basin 76. The recess 86 being large enough to fit each of the handle 74 of the deep fryer pan 72 and the basket handle 82 between the recess 86 and the rim 78 of the deep fryer pan 72. It is envisioned that the deep fryer pan 72 has a handle recess built into a side of the deep fryer pan 72 that allows the handle 74 to retract into the side of the deep fryer pan 72. Thus, a user is able to recess the handle 74 within the deep fryer pan 72 and out of the way while not in use.

A removable deep fryer control panel 88 is removably disposed upon the master control panel 64 via a plurality of rails 90 and a plurality of slots 92. The rails 90 are disposed upon the deep fryer control panel 88, while the slots 92 are disposed upon the master control panel 64. The rails 90 are configured to reversibly engage the slots 92 securing the deep fryer control panel 88 upon the master control panel 64 and offering a point of contact providing operational communication. The deep fryer control panel 88 includes at least one of the knobs 68.

A deep fryer heating element 94 is disposed upon and in operational communication with the deep fryer control panel 88. The deep fryer control panel 88 is configured to activate the deep fryer heating element 94 bringing the deep fryer heating element 94 to a user controlled temperature. The deep fryer heating element 94 is extended away from the deep fryer control panel 88 into the basin 76 of the deep fryer pan 72 and is configured to heat the deep fryer pan 72. A thermostat 96 is also disposed upon and in operational communication with the deep fryer control panel 88. The thermostat 96 is configured to take a temperature measurement of an oil disposed within the basin 76, sending the temperature measurement to the deep fryer control panel 88. The deep fryer control panel 88 is configured to send the temperature reading to the master control panel 64, which in turn is configured to display the temperature reading on the display panel 70. An insulation 98 partially encompasses a portion of the deep fryer heating element 94 proximal the deep fryer control panel 88. This insulation 98 insulates what would otherwise be an exposed portion of the deep fryer heating element 94 and protects a user from inadvertently burning themselves upon the heated deep fryer heating element 94.

It is envisioned that each of the master control panel 64, the rotisserie motor 42, the plurality of range heating elements 56, the plurality of oven heating elements 34, and the plurality of grill heating elements 62 may be powered by electrical power means by placing said items in circuit, connecting the circuit with an AC or DC power chord and coupling this with an electrical wall outlet. The deep fryer control panel 88 and the deep fryer heating element 94 can also be powered by electrical power means, as described above, by removably placing the deep fryer control panel 88 in circuit with the master control panel 64 and the other aforementioned electrically powered components. Additionally, it is envisioned that each of the plurality of oven heating elements 34, the plurality of range heating elements 56, and the plurality of grill heating elements 62 can be powered by gas power means. Any heating elements being powered by gas power means would also include electric spark igniters in circuit with the electrical power means to create an ignition of a flammable gas. Finally, it is envisioned that the range heating elements 56 can be induction heating elements and can heat through the principles of induction heating.

What is claimed is:

1. A combined rotisserie oven, range and fryer comprising:
    an oven housing having a plurality of walls forming an oven compartment;
    an access door disposed in one of the walls enclosing the oven compartment;
    a plurality of oven heating elements disposed within the oven compartment;
    a removable rotisserie spit disposed within the oven compartment, the rotisserie spit in operational communication a rotisserie motor disposed within the oven compartment;
    a removable drip pan disposed within the oven compartment proximal a bottom of the oven compartment;
    a range top disposed upon a top of the oven housing, the range top having a surface area, a plurality of range burners, each range burner of the plurality of range burners having a range heating element, wherein the range top has a fryer pan chamber;
    wherein the plurality of range burners is at least four, wherein the fryer pan chamber is integrally disposed within the range top, wherein the fryer pan chamber occupies at least one quarter of the surface area of the range top;
    a grill disposed upon the range top, the grill having a plurality of grill heating elements;
    a master control panel disposed upon the top of the oven housing, the master control panel having a plurality of buttons, a plurality of knobs, and a display panel, the master control panel in operational communication with and configured to activate each of the plurality of oven heating elements, the rotisserie motor, the plurality of range heating elements, and the plurality of grill heating elements, the knobs configured to activate each of the respective range heating elements, the buttons configured to activate each of the oven heating elements, the display panel configured to display temperature and time measurements;
    a deep fryer pan having a handle, a basin, and a rim, the deep fryer pan removably disposed upon the range top within the fryer pan chamber, the rim configured to overlay the range top;
    a deep fryer control panel removably disposed upon the master control panel via a plurality of rails, the rails disposed upon each of the master control panel and the deep fryer control panel, respectively; and
    a deep fryer heating element disposed upon and in operational communication with the deep fryer control panel, the deep fryer control panel configured to activate the deep fryer heating element, the deep fryer heating element configured to heat the deep fryer pan;
    wherein the oven heating elements, the range heating elements, and the deep fryer heating element are simultaneously operable.

2. The combined rotisserie oven, range and fryer of claim 1 further comprising:
    a plurality of rails disposed upon the deep fryer control panel; and
    a plurality of slots disposed upon the master control panel;
    wherein the rails are configured to reversibly engage the slots securing the deep fryer control panel upon the master control panel.

3. The combined rotisserie oven, range and fryer of claim 2 wherein the deep fryer
    heating element is extended away from the deep fryer control panel into the basin of the deep fryer pan, the deep fryer pan having a handle.

4. The combined rotisserie oven, range and fryer of claim 3 including:
    a thermostat disposed upon and in operational communication with the deep fryer control panel, the thermostat configured to take a temperature reading of an oil disposed within the basin, the deep fryer control panel configured to send the temperature reading to the master control panel.

5. The combined rotisserie oven, range and fryer of claim 4 further comprising:
    an insulation partially encompassing a portion of the deep fryer heating element proximal the deep fryer control panel.

6. The combined rotisserie oven, range and fryer of claim 5 further comprising:
    a deep fryer basket having a basket handle, the deep fryer basked configured to fit within the basin of the deep fryer pan.

7. The combined rotisserie oven, range and fryer of claim 6 wherein the rotisserie
    motor includes a rotisserie motor gear;
    a rotisserie spit gear is disposed within the oven compartment;
    the rotisserie spit includes at least one spear, the rotisserie spit is reversibly engaged with the rotisserie spit gear; and
    the rotisserie motor gear in operational communication with the rotisserie spit gear via a chain.

8. The combined rotisserie oven, range and fryer of claim 7 further comprising:
    a drawer disposed in the oven housing.

9. The combined rotisserie oven, range and fryer of claim 8 further comprising:
    a window disposed upon the access door;
    an door handle disposed upon the access door; and
    a drawer handle disposed upon the drawer.

10. A combined rotisserie oven, range and fryer comprising:

an oven housing having a plurality of walls forming an oven compartment;

an access door having a door handle and a window, the access door disposed in one of the walls enclosing the oven compartment;

a drawer having a drawer handle, the drawer disposed in the oven housing;

a plurality of oven heating elements disposed within the oven compartment;

a rotisserie spit gear disposed within the oven compartment;

a removable rotisserie spit having at least one spear, the rotisserie spit removably disposed within the oven compartment, the rotisserie spit reversibly engaged with the rotisserie spit gear;

a rotisserie motor having a rotisserie motor gear, the rotisserie motor gear in operational communication with the rotisserie spit gear via a chain;

a removable drip pan disposed within the oven compartment proximal a bottom of the oven compartment;

a range top disposed upon a top of the oven housing, the range top having a surface area, a plurality of range burners, each range burner of the plurality of range burners having a range heating element, wherein the range top has a fryer pan chamber;

wherein the plurality of range burners is at least four, wherein the fryer pan chamber is integrally disposed within the range top, wherein the fryer pan chamber occupies at least one quarter of the surface area of the range top;

a grill disposed upon the range top, the grill top having a plurality of grill heating elements;

a master control panel disposed upon the top of the oven housing, the master control panel having a plurality of buttons, a plurality of knobs, and a display panel, the master control panel in operational communication with each of the plurality of oven heating elements, the rotisserie motor, the plurality of range heating elements, and the plurality of grill heating elements, the knobs in operational communication with each of the respective range heating elements, the buttons in operational communication with each of the oven heating elements, the display panel configured to display temperature and time measurements;

a deep fryer pan having a handle, a basin, and a rim, the deep fryer pan removably disposed upon the range top within the fryer pan chamber, the rim configured to overlay the range top;

a mesh wired deep fryer basket having a basket handle, the deep fryer basket configured to fit within the basin of the deep fryer pan;

a deep fryer pan lid having a recess, the deep fryer pan lid configured to rest flushly upon the rim of the deep fryer pan and enclose the basin, the recess large enough to fit each of the handle of the deep fryer pan and the basket handle between the recess and the rim of the deep fryer pan;

a removable deep fryer control panel removably disposed upon the master control panel via each of a plurality of rails and a plurality of slots, the rails disposed upon the deep fryer control panel, the slots disposed upon the master control panel, wherein the rails are configured to reversibly engage the slots securing the deep fryer control panel upon the master control panel;

a deep fryer heating element disposed upon and in operational communication with the deep fryer control panel, the deep fryer control panel configured to activate the deep fryer heating element, the deep fryer heating element extended away from the deep fryer control panel into the basin of the deep fryer pan, the deep fryer heating element configured to heat the deep fryer pan;

wherein the oven heating elements, the range heating elements, and the deep fryer heating element are simultaneously operable;

a thermostat disposed upon and in operational communication with the deep fryer control panel, the thermostat configured to take a temperature reading of an oil disposed within the basin, the deep fryer control panel configured to send the temperature reading to the master control panel; and an insulation partially encompassing a portion of the deep fryer heating element proximal the deep fryer control panel.

* * * * *